Patented Nov. 17, 1931

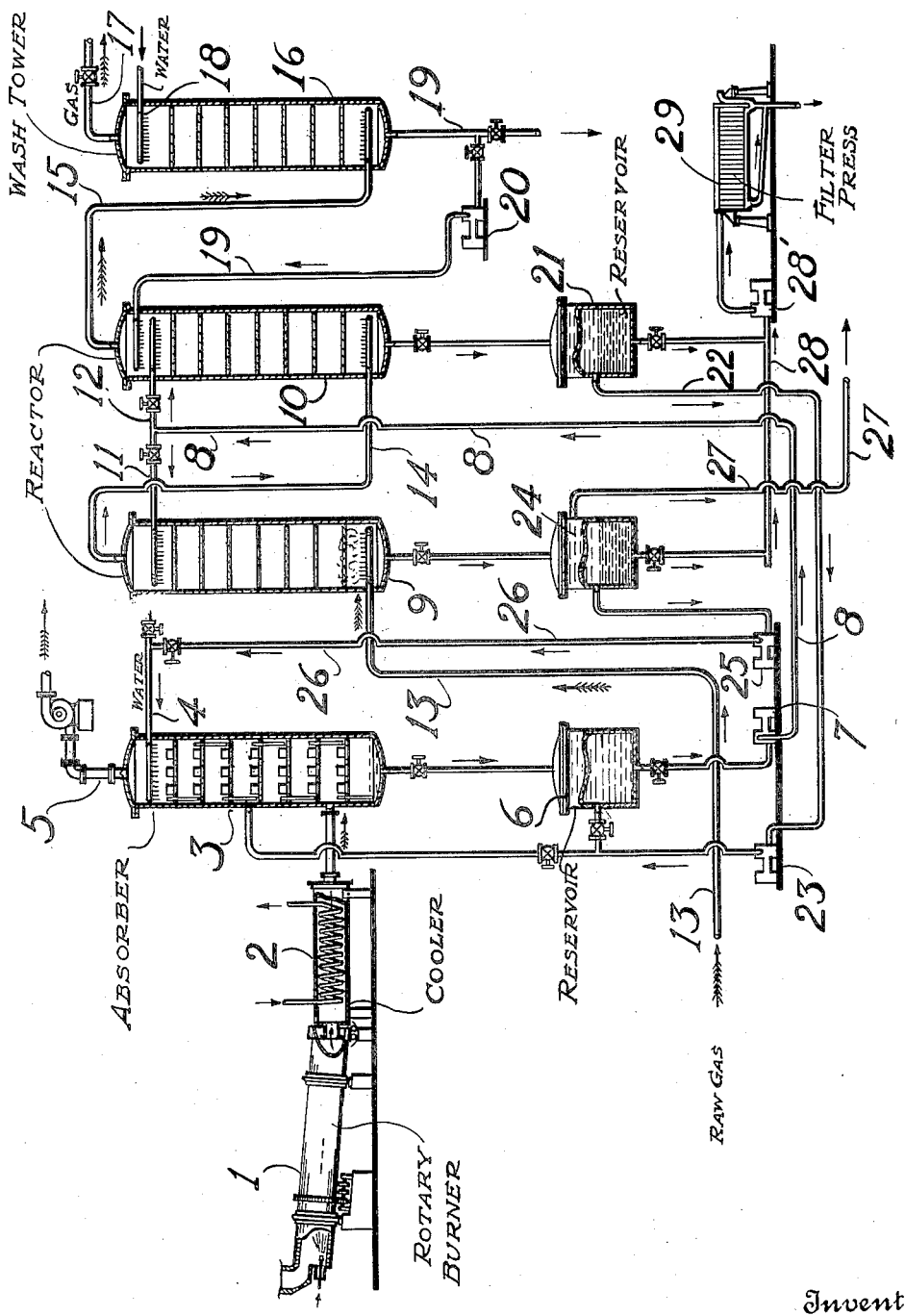

1,832,448

UNITED STATES PATENT OFFICE

STEWART P. COLEMAN, OF HOUSTON, AND BRIAN MEAD, OF BAYTOWN, TEXAS, ASSIGNORS TO STANDARD OIL DEVELOPMENT COMPANY, A CORPORATION OF DELAWARE

PROCESS FOR PURIFICATION OF GAS

Application filed September 21, 1928. Serial No. 307,465.

The present invention relates to the art of purifying gases or gas mixtures, and more specifically comprises an improved process for removing hydrogen sulphide from gases such as natural or artificial gas or from other gases. The improved process will be fully understood from the following description and the drawing which illustrates an apparatus suitable for the process.

The drawing is a semi-diagrammatic view in sectional elevation of an apparatus constructed to carry out the process and indicates the flow of materials.

Referring to the drawing, numeral 1 denotes a source of sulphur dioxide, and in the specific embodiment a rotary sulphur burner is shown; but it will be understood that the sulphur dioxide or gas containing the same may be derived from any convenient source, such as burners for sulphur-containing materials, pyrite roasters or from high pressure cylinders or by burning a portion of the $H_2S$ containing gas to be treated.

The sulphur dioxide containing gas is cooled in a cooler 2 and is passed into the base of an absorber 3 which may be in the form of a bellcap tower. Water is introduced into the top of tower 3 by pipe 4 and the gases which are substantially free of $SO_2$ are exhausted to the air by pipe 5. Sulphur dioxide in solution is collected from the base of tower 3 into a reservoir 6 from which it is forced by pump 7 through line 8 to the tops of a series of reaction towers. Only two towers 9 and 10 are shown in the drawing and the fluid is taken to the tops of these towers by branch lines 11 and 12.

Raw gas is fed to the base of tower 9 by pipe 13 at atmospheric pressure or lower, but preferably at pressure in excess of atmospheric and is conducted from the top of tower 9 to the base of tower 10 by line 14. The gas after passing through tower 10 now preferably passes by line 15 to a final washing tower 16 and thence to storage (not shown) by line 17 or to whatever point it is to be used.

Water is used to scrub the gas in tower 16 and it is admitted at the top by line 18. After flowing through tower 16 it is forced through line 19 by pump 20 to the upper part of tower 10 and the combined liquid from pipes 19 and 12 flows downwardly through the tower and is collected in a reservoir 21 in which the liquid stratifies into two layers. Line 22 and pump 23 conduct the liquid from the upper layer back to reservoir 6 or to tower 3 for re-use.

The liquid flowing from tower 9 is likewise collected in a reservoir 24 in which upper and lower layers also stratify. Part of the liquid from the upper layer may be pumped by pump 25 through line 26 to line 4 to be used as a scrubbing medium for tower 3 and the remainder may be discarded by line 27. The amount of liquid discarded from reservoir 24 is preferably made approximately equal to the quantity of fresh water introduced in tower 16. The liquid from the lower layers in the reservoirs 21 and 24 are withdrawn into a manifold 28 which conducts the liquid suspension of sulphur to a filter press 29 by which sulphur is obtained from the liquid as will be understood.

In the operation of the process sulphur dioxide is dissolved in water and the solution is used to scrub gas mixtures containing hydrogen sulphide. Sulphur is precipitated in a finely divided, sometimes colloidal, form and may be removed from the treating towers as a slurry in water. Salt may be added to break the colloid, but we prefer to use salt water as the treating medium which accomplishes the same result.

The reaction proceeds very rapidly in liquid phase and the hydrogen sulphide content of gases may be greatly reduced by our method. In the arrangement described the treatment takes place in a plurality of zones. In tower 9 there is an excess of hydrogen sulphide over the sulphur dioxide required to react according to the following equation:

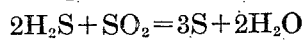

$$2H_2S + SO_2 = 3S + 2H_2O$$

and it is found that the gas still contains hydrogen sulphide. The liquid from the tower settles into two layers, the upper being water substantially free of both sulphur and sulphur dioxide, while the lower is a suspension of sulphur. In tower 10 the quantity of sulphur dioxide provided is preferably in considerable excess over the hydrogen sulphide remaining in the gas, and the exit gas is substantially free of hydrogen sulphide. It is given a final water or soda wash. The liquid from tower 10 settles into two layers, the upper being a solution of sulphur dioxide which is recovered, and the lower a suspension of sulphur. Sulphur removed from the suspensions may be burned to produce sulphur dioxide for the process, or may be otherwise disposed of.

If it is desired a substantial excess of sulphur dioxide in solution may be provided in each tower and it is preferable to provide sufficiently large towers so that equilibrium is substantially reached. The losses of sulphur dioxide may be made so small as to cause no objection in respect to pollution of air or water. The process may be advantageously operated under high pressures which favor the completion of the reaction, for example, 1000 to 3000 pounds per square inch or higher.

As an example of our process a gas containing 25% of hydrogen sulphide is passed through two towers in series. The first tower is fed at the top with a solution of sulphur dioxide containing 5.7% $SO_2$, the rate of gas and liquid being so adjusted that approximately 8.3 times the theoretical amount of sulphur dioxide is present. The gas is then washed with water in the second tower and the exit gas is found to contain about .034% $H_2S$ by volume. The liquid effluent contains about 70% of the total sulphur dioxide fed to the system.

Our process is not to be limited by any theory of the mechanism of the process nor by any example which is given merely by way of illustration, but only by the following claims in which we wish to claim all novelty inherent in our invention.

We claim:

1. An improved process for reducing the hydrogen sulfide content of gas mixtures containing the same, comprising scrubbing the gas in at least two zones with a solution of sulfur dioxide in water, the hydrogen sulfide being in excess of sulfur dioxide in the first zone, and separating sulfur from the spent treating solutions.

2. An improved process for reducing the hydrogen sulfide content of gas mixtures containing the same, comprising scrubbing the gas in at least two zones with a solution of sulfur dioxide in water, the sulfur dioxide being in excess of hydrogen sulfide in the last zone, and separating sulfur from the spent treating solutions.

3. The process for reducing the hydrogen sulfide content of gas mixtures containing the same, comprising dissolving sulfur dioxide in a stream of water in an absorption zone, scrubbing the gas with the solution containing less sulfur dioxide than is required to react with the hydrogen sulfide in a reaction zone, separating sulfur from the spent treating solution, returning spent solution to the absorption zone to dissolve additional sulfur dioxide, scrubbing the gas in a second reaction zone with the solution containing more sulfur dioxide than is required to react with the hydrogen sulfide, separating sulfur from the spent treating solution, and reusing spent solution to scrub additional gas.

STEWART P. COLEMAN.
BRIAN MEAD.